(12) United States Patent
Lee et al.

(10) Patent No.: US 11,907,291 B2
(45) Date of Patent: Feb. 20, 2024

(54) SYSTEM FOR INTEGRAL ANALYSIS AND MANAGEMENT OF VIDEO DATA

(71) Applicant: XII Lab, Gangnam-gu Seoul (KR)

(72) Inventors: Woo Yung Lee, Seoul (KR); Dae Su Chung, Seoul (KR)

(73) Assignee: XII Lab, Seoul (KR)

( * ) Notice: Subject to any disclaimer, the term of this patent is extended or adjusted under 35 U.S.C. 154(b) by 0 days.

(21) Appl. No.: 17/923,247

(22) PCT Filed: Jul. 2, 2020

(86) PCT No.: PCT/KR2020/008630
§ 371 (c)(1),
(2) Date: Nov. 4, 2022

(87) PCT Pub. No.: WO2021/225217
PCT Pub. Date: Nov. 11, 2021

(65) Prior Publication Data
US 2023/0229700 A1 Jul. 20, 2023

(30) Foreign Application Priority Data
May 7, 2020 (KR) ........................ 10-2020-0054310

(51) Int. Cl.
G06F 16/732 (2019.01)
G06F 16/783 (2019.01)
G06F 16/75 (2019.01)

(52) U.S. Cl.
CPC ........ *G06F 16/7837* (2019.01); *G06F 16/732* (2019.01); *G06F 16/75* (2019.01)

(58) Field of Classification Search
CPC .... G06F 16/7837; G06F 16/732; G06F 16/75; G06F 18/23; G06F 16/71; G06F 16/783;
(Continued)

(56) References Cited

U.S. PATENT DOCUMENTS 8,719,884 B2 5/2014 Sharon et al.
9,525,900 B2 12/2016 Motiwala et al.
(Continued)

FOREIGN PATENT DOCUMENTS

CN 104137553 A 11/2014
CN 104137553 B 9/2017
(Continued)

OTHER PUBLICATIONS

KIPO, International Search Report for International Patent Application No. PCT/KR2020/008630, dated Jan. 22, 2021, 5 pages.
(Continued)

*Primary Examiner* — Jorge A Casanova
(74) *Attorney, Agent, or Firm* — IP Spring

(57) ABSTRACT

A system for integrated analysis and management of video data includes a routing server configured to receive video data from an external input video providing device, a video database configured to store the received video data, a video analyzing server cluster including a plurality of video analyzing servers configured to analyze the video data, a metadata database configured to store metadata of the video data, and a video search server configured to search the metadata database and the video database. As described in various embodiments of the present disclosure, the system can perform integrated analysis of various video data received from a number of channels and provide an analysis result, and can also rapidly provide an accurate search result in response to a user's request for search.

19 Claims, 10 Drawing Sheets

(58) Field of Classification Search
CPC ... G06F 18/285; G06F 16/74; G06V 2201/10; G06V 10/40; H04N 21/231; H04N 21/4828; H04N 7/18; H04N 21/23418; G06N 3/08
See application file for complete search history.

(56) References Cited

U.S. PATENT DOCUMENTS

| | | | |
|---|---|---|---|
| 10,291,657 | B2 | 5/2019 | Narayanaswamy et al. |
| 10,812,531 | B2 | 10/2020 | Narayanaswamy et al. |
| 10,826,940 | B2 | 11/2020 | Narayanaswamy et al. |
| 10,977,307 | B2 * | 4/2021 | Pereira ............ G06T 7/11 |
| 2013/0071087 | A1 | 3/2013 | Motiwala et al. |
| 2013/0326573 | A1 | 12/2013 | Sharon et al. |
| 2016/0353139 | A1 * | 12/2016 | Smith ............ H04N 21/233 |
| 2017/0264619 | A1 | 9/2017 | Narayanaswamy et al. |
| 2017/0264640 | A1 | 9/2017 | Narayanaswamy et al. |
| 2018/0367575 | A1 | 12/2018 | Narayanaswamy et al. |
| 2019/0268379 | A1 | 8/2019 | Narayanaswamy et al. |
| 2019/0268381 | A1 | 8/2019 | Narayanaswamy et al. |
| 2019/0327272 | A1 | 10/2019 | Narayanaswamy |
| 2020/0145463 | A1 | 5/2020 | Narayanaswamy et al. |
| 2020/0177637 | A1 | 6/2020 | Narayanaswamy et al. |
| 2021/0174164 | A1 * | 6/2021 | Hsieh ............ G06Q 30/0282 |
| 2021/0174565 | A1 * | 6/2021 | Awasthi ............ G06F 40/20 |
| 2021/0248376 | A1 * | 8/2021 | Zhao ............ G06V 20/49 |

FOREIGN PATENT DOCUMENTS

| | | |
|---|---|---|
| EP | 3427179 A1 | 1/2019 |
| EP | 3427179 B1 | 8/2019 |
| EP | 3584735 A1 | 12/2019 |
| JP | 6518844 B1 | 5/2019 |
| JP | 2019-516154 A | 6/2019 |
| JP | 2019-153330 A | 9/2019 |
| KR | 10-2014-0079775 A | 6/2014 |
| KR | 10-1526499 B1 | 6/2015 |
| KR | 10-2043192 B1 | 11/2019 |
| WO | 2013040545 A1 | 3/2013 |
| WO | 2017156497 A1 | 9/2017 |
| WO | 2019226363 A9 | 7/2019 |
| WO | 2019226363 A1 | 11/2019 |

OTHER PUBLICATIONS

KIPO, Written Opinion for International Patent Application No. PCT/KR2020/008630, dated Jan. 22, 2021, 8 pages.
KIPO, Office Action for Korean Patent Application No. 10-2020-0054310, dated Jul. 26, 2021, 17 pages.
KIPO, Decision of Registration for Korean Patent Application No. 10-2020-0054310, dated Jan. 24, 2022, 7 pages.

* cited by examiner

| CHANNEL | OBJECT CLASSIFICATION | METADATA | | | | | | |
|---|---|---|---|---|---|---|---|---|
| CH1 | PERSON (P) | P0138 IMAGE | | P2413 IMAGE | | P0138 IMAGE | | ... |
| | CAR (C) | C1217 IMAGE | | C3448 IMAGE | | | | |
| | ... | ... | | | | | | |
| CH2 | PERSON (P) | P2413 IMAGE | | P0138 IMAGE | | | | |
| | CAR (C) | C3448 IMAGE | | C1217 IMAGE | | C3448 IMAGE | | ... |
| | ... | ... | | | | | | |
| ... | | | | | | | | |

FIG. 4A

| OBJECT CLASSIFICATION | OBJECT NAME | INVERSE FEATURE | | | | | | |
|---|---|---|---|---|---|---|---|---|
| PERSON (P) | P0138 | CH1 | ▨ | CH2 | ▨ | CH1 | ▨ | ⋯ |
| | P2413 | CH2 | ▨ | CH1 | | ⋯ | | |
| | ⋯ | | | | | | | |
| CAR (C) | C1217 | CH1 | ▨ | CH2 | ▨ | | ⋯ | |
| | C3448 | CH2 | ▨ | CH1 | ▨ | CH2 | ▨ | ⋯ |
| | ⋯ | ⋯ | | | | | | |
| ⋯ | | | | | | | | |

FIG. 4B

| COLUMN NAME | CASE 1 | CASE 2 |
|---|---|---|
| CAMERA-IMAGE ID* | ST2303 | DR2034 |
| CAMERA IP | 123.12.34.20 | 231.23.45.31 |
| ENCODING TYPE | H.264 | HD.264 |
| CAMERA TYPE | CCTV | DRONE |
| IMAGE RESOLUTION | HD | 4K |
| RECORDING DEVICE TYPE | FIXED | MOBILE |
| CONTENT CATEGORY | PARKING LOT | AIR VIEW-DOWNTOWN |
| CAMERA LOCATION | N37.29' 20.73" | NA |
| CAMERA HEIGHT | 3m | NA |
| TILT ANGLE | 45 | NA |
| PAN ANGLE | 135 | NA |
| NUMBER OF DECODING FRAMES PER SECOND | 2 | 30 |
| USE | IMAGE RECOGNITION | TRAINING |

FIG. 5

SYSTEM FOR INTEGRAL ANALYSIS AND MANAGEMENT OF VIDEO DATA

CROSS-REFERENCE TO RELATED APPLICATIONS

This application is the U.S. National Stage filing under 35 U.S.C. § 371 of International Patent Application No. PCT/KR2020/008630, filed on Jul. 2, 2020, which in turn claims priority under PCT Article 8 and/or 35 U.S.C. § 119(a) to Korean Patent Application No. 10-2020-0054310, filed on May 7, 2020. Korean Patent Application No. 10-2020-0054310 is incorporated herein by reference in its entirety.

TECHNICAL FIELD

The present disclosure relates to a method and system for integrated analysis and management of video data. Specifically, the present disclosure provides a method and system that can allocate a lot of video data input from a plurality of channels, which provides input video, to a specific video analyzing server of a video analyzing server cluster including a plurality of video analyzing servers through a routing server, recognize and analyze an object recorded in the video data, and provide the analyzed video data to an external image output device, and can also classify objects by category while recognizing images, extract metadata of each object, store the extracted metadata in a database for easy search later, and enable a lot of users to participate in deep learning for object recognition, which enables more sophisticated recognition and distribution and utilization of object data learned through deep learning.

BACKGROUND

Unless otherwise indicated herein, the materials described in this section are not prior art to the claims in this application and are not admitted as prior art by inclusion in this section.

A CCTV security system that collects image information input through fixed or mobile cameras installed in a certain area or place, an object recognition system that classifies individual objects by applying intelligent image analysis, and a license plate recognition system for collecting various types of image information about a vehicle, such as speed of a driving vehicle, are known as general systems for collecting information from video data.

These systems only analyze specific information input from a recording device for each purpose and provide the analyzed specific information to a user. Also, these systems have a certain limitation in the number of recording devices that provide input video data, i.e., channels to process, and, thus, it is difficult to add a large number of channels in parallel, and video data input simultaneously from a plurality of channels cannot be processed smoothly.

Meanwhile, in a system for processing video data input from a plurality of channels, video generated by respective video recording devices has different characteristics and is recognized by different methods and algorithms accordingly. Therefore, whenever a new video channel is added, the structure of an image recognition and processing system needs to be modified.

Further, a multi-channel analyzing system that enables a user to easily and quickly search for analyzed and recognized object data is required, and if a plurality of users participates in modeling through deep learning in the analysis, a video analyzing system can be more reliable.

SUMMARY

The present disclosure is intended to solve the above-described problems and/or various other problems.

More specifically, the present disclosure is intended to provide a system that forms video data received from an input video providing device, which provides various types of input video, into a video database for efficient search; allocates the video data to a specific video analyzing server among a plurality of video analyzing servers configured as a video analyzing server cluster according to the type or characteristics of the video to perform video analysis and recognition and thus to increase recognition efficiency; provides the analyzed and recognized video data in a video format satisfying the requirements of a user; and efficiently specifies a channel and time corresponding to video including a specific object according to a search query from a user device and quickly searches for the video from the video database.

Also, the present disclosure is intended to facilitate effective participation of many general users or deep learning experts in deep learning for object recognition through a deep learning platform web interface for a number of external users; evaluate and store a video analysis model or an image recognition algorithm generated through deep learning; and enable them to be used usefully in other systems and applied as independent applications with economic value.

A system for integrated analysis and management of video data according to an embodiment of the present disclosure may include: a routing server configured to receive video data from an external input video providing device; a video database configured to store the received video data; a video analyzing server cluster including a plurality of video analyzing servers configured to analyze the video data; a metadata database configured to store metadata of the video data; and a video search server configured to search the metadata database and the video database. Herein, the routing server may be further configured to allocate analysis of the video data to a specific video analyzing server among the plurality of video analyzing servers of the video analyzing server cluster according to characteristics of the received video data, and the characteristics of the received video data may include at least one of a type of a channel that records the video data, a characteristic of the channel, and a type of an object to be recognized among objects recorded (or photographed) in the video data.

The specific video analyzing server allocated the analysis of the video data by the routing server among the plurality of video analyzing servers of the video analyzing server cluster is further configured to analyze the video data to recognize one or more objects included therein and generate the metadata according to a recognition result. The specific video analyzing server may be further configured to generate inverse features based on the generated metadata, and the metadata database may be further configured to store the generated inverse features. The video search server may be further configured to receive a video search query from an external user device and search at least one of the metadata database and the video database based on the received search query. Also, the video search server may be further configured to obtain information about video data required in the search query by searching the metadata database based on the search query, and obtain the video data required in the search query by searching the video database based on the obtained information.

Meanwhile, the system may further include: a video converter configured to generate a graphic user interface in a predetermined format based on an analysis result of the video analyzing server cluster; and an I/O server configured to transmit an analysis result image of the video analyzing server cluster to an external video output/control device and receive a video search query from an external user device.

The system may further include: a deep learning server configured to learn video data stored in the video database and generate a video analysis model; and a learning data result value database configured to store the video analysis model generated in the deep learning server. Herein, the deep learning server may be configured to provide at least one of easy training and hard training for video data learning to a user connected through a deep learning platform web interface for a number of users outside the system.

Further, a method for integrated analysis and management of video data that is performed by one or more computing devices in a video analysis and management system according to an embodiment of the present disclosure may include: a process of receiving video data from any one channel of an input video providing device including a plurality of channels; a process of allocating the received video data to a specific video analyzing server of a video analyzing server cluster including a plurality of video analyzing servers in the video analysis and management system; a process of analyzing the video data by the specific video analyzing server to recognize one or more objects included therein; and a process of generating a graphic user interface in a predetermined format based on an analysis result and an object recognition result. The method may further include a process of storing the received video data in a video database in the video analysis and management system, and the video database may be a NoSQL database based on Hbase.

The method may further include: a process of generating metadata of the recognized one or more objects by the specific video analyzing server; a process of generating inverse features based on the generated metadata by the specific video analyzing server; and a process of storing the generated metadata and inverse features in a metadata database in the video analysis and management system. According to another embodiment of the present disclosure, the method may further include: a process of receiving a search query for a specific object from an external user device; a process of searching at least one of the metadata database and the video database based on the received search query; and a process of transmitting a search result to the external user device. In this case, the method may further include: a process of determining whether the search result is suitable for the search query; and a process of searching at least one of the metadata database and the video database based on the received search query when it is determined not suitable for the search query.

In a computer-readable storage medium that stores a computer program for integrated analysis and management of video data according to an embodiment of the present disclosure, instructions included in the computer program may include: at least one instruction to receive video data from any one channel of an input video providing device including a plurality of channels; at least one instruction to allocate the received video data to a specific video analyzing server of a video analyzing server cluster including a plurality of video analyzing servers in a video analysis and management system; at least one instruction to analyze the video data by the specific video analyzing server to recognize one or more objects included therein; and at least one instruction to generate a graphic user interface in a predetermined format based on an analysis result and an object recognition result. Herein, the computer program may further include: at least one instruction to receive a search query for a specific object from an external user device; at least one instruction to search at least one of a metadata database and a video database based on the received search query; and at least one instruction to transmit a search result to the external user device.

The foregoing summary is illustrative only and is not intended to be in any way limiting. In addition to the illustrative embodiments and features described above, further embodiments and features will become apparent by reference to the drawings and the following detailed description.

BRIEF DESCRIPTION OF THE DRAWINGS

The foregoing and other features of the present disclosure will be described in detail with reference to the accompanying drawings. Understanding that these drawings depict only several examples in accordance with the disclosure and are, therefore, not to be considered limiting of its scope, the disclosure will be described with additional specificity and detail through use of the accompanying drawings, in which:

FIG. 4A shows an example of metadata extracted from input video data according to an embodiment of the present disclosure, and FIG. 4B shows an example of inverse features generated based on the metadata according to an embodiment of the present disclosure;

FIG. 5 shows an example of channel metadata for channels of an input video providing device;

DETAILED DESCRIPTION

The terms used herein are used only to describe specific examples, but do not intend to limit the present disclosure. A singular expression includes a plural expression unless it is clearly construed in a different way in the context. All terms including technical and scientific terms used herein have the same meaning as commonly understood by a person with ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. In some cases, even terms defined in the present disclosure should not be interpreted as excluding embodiments of the present disclosure.

The foregoing features and other features of the present disclosure will be sufficiently apparent from the following descriptions with reference to the accompanying drawings. These drawings merely illustrate several embodiments in accordance with the present disclosure. Therefore, they should not be understood as limiting the present disclosure. The present disclosure will be described in more detail with reference to the accompanying drawings.

Figure 1:
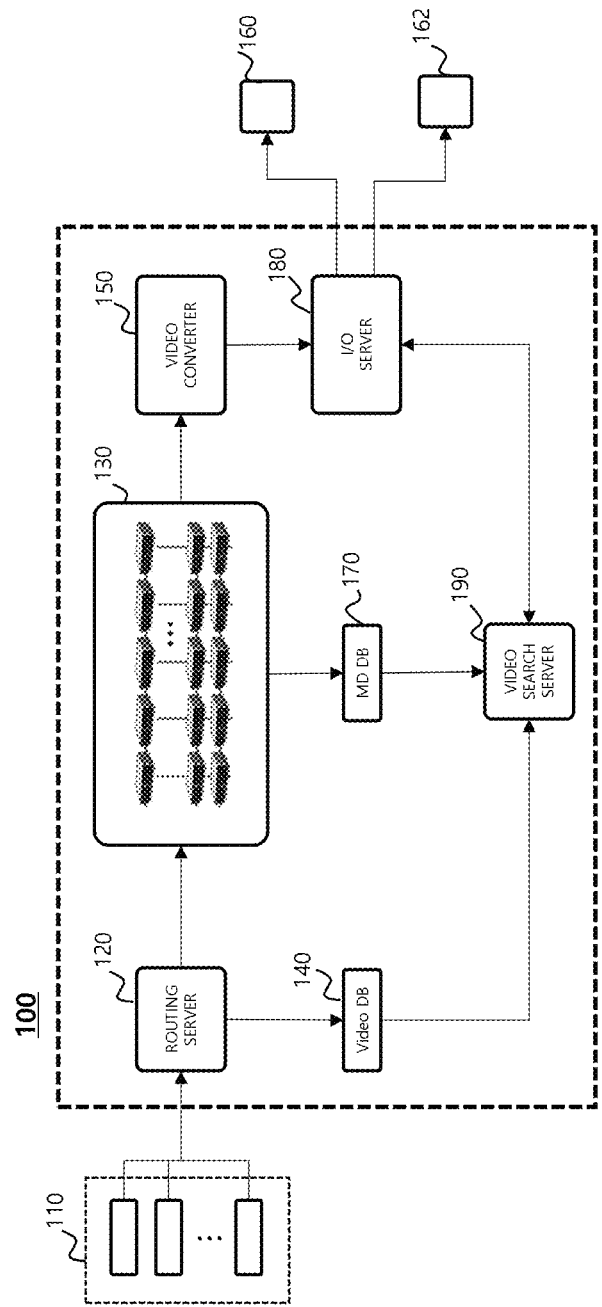
FIG. 1 is a configuration view of a system for integrated analysis and management of video data according to an embodiment of the present disclosure.

FIG. 1 illustrates a system for integrated analysis and management of video data according to an embodiment of the present disclosure.

Referring to FIG. 1, a system 100 for integrated analysis and management of video data may be configured to receive input video from an external input video providing device 110 and process the input video. System 100 may provide the processed video data to a video output/control device 160. Also, system 100 may receive an input of a search query from a user device 162 and provide video data corresponding to the search query to user device 162 and/or video output/control device 160. Herein, user device 162 may be linked with video output/control device 160 or may operate separately from video output/control device 160.

A communication linkage between system 100 and input video providing device 110, input video providing device 110, video output/control device 160 and/or user device 162 may be established in various wired or wireless ways. A network that enables the communication linkage may include, for example, a radio frequency (RF) network, a third generation partnership project (3GPP) network, a long term evolution (LTE) network, a world interoperability for microwave access (WIMAX) network, the Internet, a local area network (LAN), a wireless LAN, a wide area network (WAN), a personal area network (PAN), a Bluetooth network, a near field communication (NFC) network, a satellite broadcasting network, an analog broadcasting network, and a digital multimedia broadcasting (DMB) network, but is not limited thereto.

Input video providing device 110 may include a plurality of input video generating devices. The input video generating device may include a video recording device such as a CCTV. Also, the input video generating device may be a device, such as a synthetic video generator, that generates synthetic video instead of an actual image obtained through a video recording device. Each of such various input video generating devices constitutes a single video channel, and input video generated by each channel is provided as original video data to system 100. Hereinafter, each input video generating device of input video providing device 110 will also be referred to as a channel.

System 100 shown in FIG. 1 may include a routing server 120, a video analyzing server cluster 130, a video database 140, a video converter 150, a metadata database 170, an I/O server 180 and a video search server 190. Herein, I/O server 180 may be omitted in some cases. In this case, video converter 150 may directly provide processed video data to video output/control device 160 through the above-described communication linkage, and user device 162 may perform a video search through a direct communication linkage with video search server 190.

Routing server 120 may receive input video from each channel of input video providing device 110 and store the input video as original video data in video database 140. The original video data stored in video database 140 may be provided to user device 162 in response to a user's request for search.

Also, routing server 120 may route processing of images from a specific channel to a specific server in video analyzing server cluster 130 according to characteristics of each channel of input video providing device 110.

Video analyzing server cluster 130 is composed of a plurality of video analyzing servers, and each video analyzing server may be equipped with one or more high-specification GPUs for high-quality video analysis. Also, each video analyzing server may be designed to be suitable for analysis of specific video. For example, each video analyzing server may be classified into a video analyzing server suitable for recognizing and processing a person, a video analyzing server suitable for recognizing and processing a car, and the like depending on an object included in video. Further, each video analyzing server may be designed to be suitable for processing video data of a specific situation, and may be classified into, for example, a video analyzing server suitable for processing video data with generally low brightness, such as video recorded through a camera installed in a tunnel, a video analyzing server suitable for processing video data with generally high brightness, such as video recorded through a camera installed outdoors, and the like. Furthermore, each video analyzing server may be designed to be suitable for processing video data according to characteristics of each channel, such as a type of the channel. For example, each video analyzing server may be classified into a video analyzing server with a fixed channel suitable for processing high-quality video data, such as a CCTV, a video analyzing server with a mobile channel suitable for processing low-quality video data, such as a drone, and the like. Each video analyzing server of video analyzing server cluster 130 may analyze video data from a specific channel allocated by the routing server, extract metadata of the video data and then store the metadata in metadata database 170. Also, each video analyzing server may generate inverse features from the extracted metadata and store the inverse features in metadata database 170. Specific examples of the metadata and inverse features will be described later with reference to FIG. 4A and FIG. 4B.

Further, each video analyzing server of video analyzing server cluster 130 may process input video by applying an image recognition algorithm suitable for a channel for video data to be processed. In this case, the video analyzing server may retrieve metadata of a corresponding channel from a channel meta-database regarding attributes of each channel and process input video by applying an image recognition algorithm suitable for the channel metadata. The channel metadata may include camera ID, camera IP, encoding type (e.g., H.264, H.265, etc.), camera type (e.g., CCTV, drone, etc.), image resolution (e.g., HD, 4K, etc.), recording device type (e.g., fixed, mobile, etc.), content category (e.g., parking lot, downtown street, etc.), camera location, camera height, tilt angle, pan angle, number of decoding frames per second, use, and the like, but may not be limited thereto. The channel meta-database, which is a set of channel metadata, may be stored in the form of metadata database 170 or a separate database, and may be searched and used by each video analyzing server of video analyzing server cluster 130. A specific example of the channel metadata and the use thereof for video analysis will be described later with reference to FIG. 5.

Meanwhile, the input video from each channel recognized and analyzed by each video analyzing server of video analyzing server cluster 130 is provided to video converter 150, and video converter 150 converts the recognized and analyzed input video into a predetermined format suitable for transmission to and display on video output/control device 160. Herein, the predetermined format may be previously set by a user of video output/control device 160. The input video converted into the predetermined format by video converter 150 may be provided to video output/control device 160 through I/O server 180. A specific example of the predetermined format and a picture displayed on video output/control device 160 will be described later with reference to FIG. 6.

A user of user device 162 accessing system 100 may make a request for search for specific video data to system 100 through user device 162 by using a specific search query. In an embodiment, the user of user device 162 may specific an object to be searched or retrieved through the picture displayed on video output/control device 160 and make a search query. The search query may include a tag or label of a specific object, a channel that provides video including the object, a place and/or time period thereof.

I/O server 180 of system 100 may receive the search query from user device 162 and provide the search query to video search server 190. If the above-described I/O server 180 is omitted, the search query from user device 162 may be directly provided to video search server 190.

Video search server 190 may firstly retrieve metadata database 170 by using the search query transmitted from user device 162. In this case, video search server 190 may specify a search target object included in the search query by using a tag, label or thumbnail of the object to be searched and obtains a channel that records video including the object and a recording time of the video from metadata database 170. Video search server 190 may search video database 140 for original video data based on the obtained channel and recording time, and may provide the searched original video data to user device 162 through I/O server 180. A specific example of searching metadata database 170 and video database 140 and searching for and providing original video data suitable for a search query from user device 162 by video search server 190 will be described below in more detail with reference to FIG. 4A and FIG. 4B.

Meanwhile, video database 140 may be configured as a relational database, and may be configured as a NoSQL database in which the schema is not previously defined in some embodiments. According to an embodiment of the present disclosure, if video database 140 is configured as a NoSQL database, it may be stored in HBase. HBase classified as a column-oriented NoSQL database may store a number of columns in a row, and video database 140 of the present disclosure may generate input video input from a specific channel in a row without limitation to the number of columns by using this attribute of HBase.

As a non-limiting example, video database 140 may record input video received from a specific channel in a row on a daily basis, and the input video may be generated as an individual file every second in the row. In this case, a total of 86,400 (60 seconds×60 minutes×24 hours) files, i.e., files, may be generated in a row. If video database 140 is configured in this way, it is only necessary to search a row of a specific date for video without a need to search all the rows. Accordingly, the search efficiency can be improved.

In system 100 shown in FIG. 1, video data received from input video providing device 110 that provides various input video streams may be configured as video database 140 for efficient search, and may be allocated (or assigned) to a suitable video analyzing server of video analyzing server cluster 130 through routing server 120 according to a type or characteristics of input video, and, thus, the input video is analyzed and recognized, which results in improvement in recognition efficiency. Also, in system 100 shown in FIG. 1, the analyzed and recognized video data may be provided in a format satisfying the requirements of a user to video output/control device 160 through video converter 150, and metadata may be extracted from the video data for object search and stored in metadata database 170 together with inverse features thereof, and, thus, a channel and time of video including a specific object can be efficiently specified according to a search query from user device 162 and can be quickly searched from video database 140.

Figure 2:
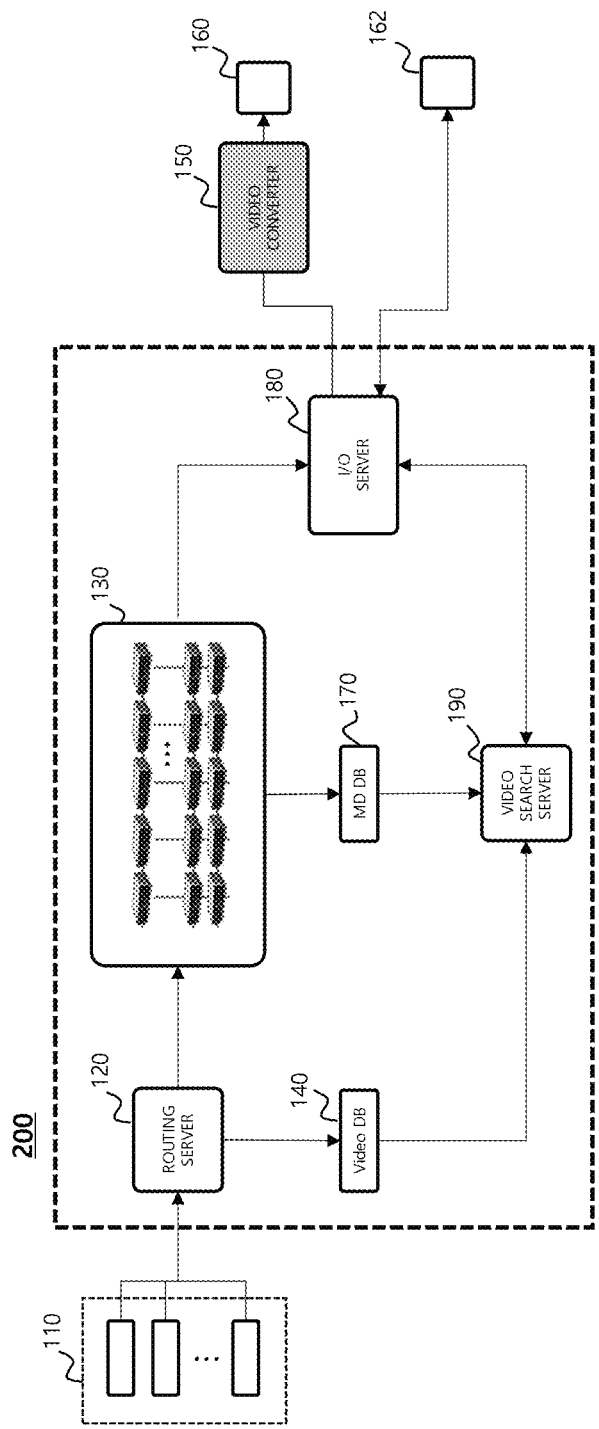
FIG. 2 is a configuration view of a system for integrated analysis and management of video data according to another embodiment of the present disclosure.

FIG. 2 is a configuration view of a system for integrated analysis and management of video data according to another embodiment of the present disclosure.

The components shown in FIG. 2 perform identical or similar functions to the respective components shown in FIG. 1 and are assigned the same reference numerals as the respective components shown in FIG. 1. Hereinafter, the detailed description of the components that perform identical or similar functions to the respective components shown in FIG. 1 will be omitted for simplicity.

A system 200 for integrated analysis and management of video data shown in FIG. 2 is different from system 100 shown in FIG. 1 in that video converter 150 is omitted. That is, in FIG. 2, video converter 150 is provided on the user side outside system 200, i.e., in video output/control device 160 of the user.

Herein, video converter 150 may receive video data analyzed and recognized by video analyzing server cluster 130 of system 200 through I/O server 180. Video converter 150 may convert the analyzed and recognized video data into a format previously set by the user of video output/control device 160 and then provide it to video output/control device 160, and video output/control device 160 may display the same. According to an embodiment, the format previously set by the user may be a screen or graphic user interface to be displayed. This graphic user interface may include, for example, a part showing real-time images from a plurality of channels, a part showing the state of the spaces covered by the respective channels, and a part showing the movement paths of objects recorded by each channel as an analysis result of the channel. The graphic user interface will be described in detail later with reference to FIG. 6.

Figure 3:
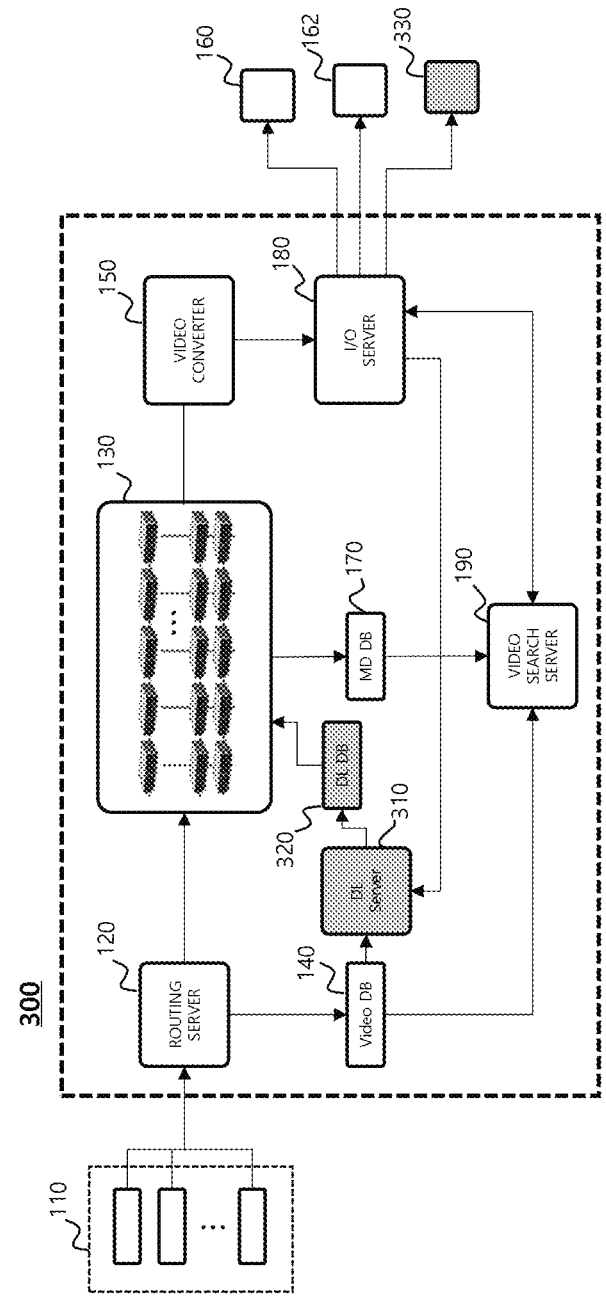
FIG. 3 is a configuration view of a system for integrated analysis and management of video data according to yet another embodiment of the present disclosure.

FIG. 3 is a configuration view of a system for integrated analysis and management of video data according to yet another embodiment of the present disclosure.

The components shown in FIG. 3 perform identical or similar functions to the respective components shown in FIG. 1 and are assigned the same reference numerals as the respective components shown in FIG. 1. Hereinafter, the detailed description of the components that perform identical or similar functions to the respective components shown in FIG. 1 will be omitted for simplicity.

A system 300 for integrated analysis and management of video data shown in FIG. 3 further includes a deep learning server 310 and a deep learning data result value database 320 in addition to system 100 shown in FIG. 1.

Deep learning server 310 may analyze original video data stored in video database 140 to generate a video analysis model or image recognition algorithm, and may store the generated video analysis model or image recognition algorithm as a deep learning result in deep learning data result value database 320. Further, the video analysis model or image recognition algorithm generated by deep learning server 310 may be used by each video analyzing server of video analyzing server cluster 130. Each video analyzing server of video analyzing server cluster 130 may search deep learning data result value database 320 for a video analysis model or image recognition algorithm suitable for a specific channel allocated to itself by routing server 120 and/or a specific object and may retrieve it for application to video analysis and object recognition.

In an embodiment related to deep learning of original video data and generation of a result value video analysis model, deep learning server 310 may divide and analyze the original video data stored in video database 140 by predetermined categories. For example, deep learning server 310 may analyze each object according to a type of the object recorded in original video data in consideration of characteristics and surrounding conditions of the object, and may generate a video analysis model or image recognition algorithm associated therewith. In another example, deep learning server 310 may analyze an object according to a channel that records original video data in consideration of a type and characteristics of the channel, and may generate a video analysis model or image recognition algorithm therefor. In this case, deep learning server 310 may use metadata of the channel, and the metadata may include camera ID, camera IP, encoding type (e.g., H.264, H.265, etc.), camera type (e.g., CCTV, drone, etc.), image resolution (e.g., HD, 4K, etc.), recording device type (e.g., fixed, mobile, etc.), content category (e.g., parking lot, downtown street, etc.), camera location, camera height, tilt angle, pan angle, number of decoding frames per second, use, and the like, but may not be limited thereto. The channel meta-database, which is a set of channel metadata, may be stored in the form of a separate database, and may be used to generate a video analysis model or image recognition algorithm by deep learning server 310.

The video analysis model or image recognition algorithm generated by deep learning server 310 may be stored by category in deep learning data result value database 320. For example, deep learning data result value database 320 may store image recognition algorithms for person, car, pet, etc. depending on a type of an object, image recognition algorithms for street, park, parking lot, etc. depending on positional characteristics of a channel, and image recognition algorithms for CCTV, drone, etc. depending on a type of a channel.

The video analysis model or image recognition algorithm stored in the database 320 as a deep learning model automatically learned internally for specific data may include a video analysis model or image recognition algorithm generated externally and added in the form of a plug-in in addition to the video analysis model or image recognition algorithm generated by deep learning server 310. The externally generated video analysis model or image recognition algorithm is generated by a deep learning server outside system 300, and may be generated by using video data from input video providing device 110 and/or learning separate video data irrelevant thereto. Since the externally generated video analysis model or image recognition algorithm is added, the image analysis and recognition rate of each video analyzing server of video analyzing server cluster 130 can be further improved.

Meanwhile, the video analysis model or image recognition algorithm generated by deep learning server 310 may be provided to other systems outside system 300. This video analysis model or image recognition algorithm is generated by deep learning server 310 analyzing a large amount of video data from input video providing device 110, and may be used usefully in the other systems and applied as an independent application with economic value.

As shown in FIG. 3, a deep learning platform web interface 330 for a number of users may be further provided outside system 300, and deep learning platform web interface 330 enables many general users or deep learning experts participating in deep learning to participate in learning through deep learning server 310 of the system. Deep learning platform web interface 330 may be configured as a web server, but is not limited thereto.

Users may access deep learning platform web interface 330 through their own separate devices, and the users may include general users such as the user of video output/control device 160 and/or the user of user device 162. Also, the users who access deep learning platform web interface 330 may be deep learning experts with specialized knowledge of deep learning. Deep learning server 310 may provide hard training to the deep learning experts and may provide easy training to the general users. In the case of easy training, deep learning server 310 may provide several options that a user can easily select through deep learning platform web interface 330, and the user may participate in deep learning by simply selecting an option. The options provided by deep learning server 310 to deep learning platform web interface 330 for easy training may include, for example, an option to select a target object, an option to select an image type, an option to select a deep learning model, an option to select a learning dataset, etc., but may not be limited thereto. Dep learning server 310 is configured to learn about video data from video database 140 according to the option selected by the user through deep learning platform web interface 330.

Deep learning server 310 may provide labeling for learning objects. For labeling, deep learning server 310 may allow a labeling operator to perform labeling through deep learning platform web interface 330. In other words, the labeling operator may access deep learning server 310 through deep learning platform web interface 330 and may perform labeling for an object in video data being analyzed and learned, and labeling for objects may be reflected in the video analysis model or image recognition algorithm and stored together in deep learning data result value database 320. Also, deep learning server 310 may provide an environment in which a plurality of labeling operators can access simultaneously and work simultaneously.

Further, deep learning server 310 may evaluate the generated video analysis model or image recognition algorithm and/or the labeling for objects. Feedback from each video analyzing server of video analyzing server cluster 130 may be used for this evaluation. The evaluation results may also be stored together in deep learning data result value database 320 and may be used later for evaluation and distribution of a video analysis model or image recognition algorithm corresponding thereto. Although deep learning server 310 shown in FIG. 3 is configured as a single server, it may be configured as a deep learning server cluster, such as video analyzing server cluster 130, composed of a plurality of deep learning servers in some embodiments. In this case, a routing device may be needed to allocate original video data from video database 140 to a suitable deep learning server according to characteristics of the corresponding channel, and this process may be performed by routing server 120 or a non-illustrated separate routing device. Further, a routing device may be needed to allocate operations of a plurality of users who accesses through deep learning platform web interface 330 to a specific deep learning server among a plurality of deep learning servers in the deep learning server cluster, and this process may be performed by I/O server 180 or a non-illustrated separate routing device.

System 300 shown in FIG. 3 is further equipped with deep learning server 310 and deep learning data result value database 320 that stores a video analysis model or image recognition algorithm as a result of learning, and, thus, the efficiency and performance related to video analysis and object recognition of each video analyzing server of video analyzing server cluster 130 can be improved and a plurality of users can participate in learning of deep learning server 310 or perform object labeling through deep learning platform web interface 330 for a plurality of external users. Meanwhile, deep learning server 310 is configured as a cluster of a plurality of deep learning servers, and, thus, a more accurate video analysis model or image recognition algorithm can be generated by a deep learning server suitable for each channel and/or video through parallel analysis and learning. As a result, the accuracy and efficiency in video analysis and object recognition of the video analyzing servers included in video analyzing server cluster 130 can be further improved.

FIG. 4A shows an example of metadata extracted from input video data according to an embodiment of the present disclosure, and FIG. 4B shows an example of inverse features generated based on the metadata according to an embodiment of the present disclosure.

As described above with reference to FIG. 1, each video analyzing server of video analyzing server cluster 130 may analyze video data of a specific channel allocated from the routing server, extract metadata of the video data, and then store the metadata in metadata database 170, and FIG. 4A shows an example of such metadata. Also, each video analyzing server of video analyzing server cluster 130 may generate inverse features from the extracted metadata and store them metadata database 170, and FIG. 4B shows an example of such inverse features.

Referring to FIG. 4A, the metadata may be classified into a person P, a car C, etc. depending on a type of an object recognized from video data provided by a corresponding channel for each of a plurality of channels CH1, CH2, . . . . That is, objects included in the video data recorded by each of channels CH1 and CH2 may include various objects such as persons and cars, and in the metadata shown in FIG. 4B, objects recognized by each channel are listed in a row according to the type of object. Accordingly, in the row corresponding to a person object P of CH1, metadata of persons recognized in the video data of CH1 are listed in each column, and in the row corresponding to a car object C of CH2, metadata of cars recognized in the video data of CH1 are listed in each column. Similarly, metadata of persons recognized in the video data of CH2 are listed in each column of the corresponding row, and metadata of cars recognized in the video data of CH2 are listed in each column of the corresponding row.

In the column of each row of metadata, the recognized objects are listed in chronological order from left to right. Also, each video analyzing server of video analyzing server cluster 130 may perform tagging to assign a unique tag to each recognized object and may put the same tag to objects recognized as the same. For example, in the row of the person object P of CH1, a tag of P0138 is tagged to a person recognized first in the video data of CH1 and a tag of P2413 is tagged to a person recognized subsequently. Then, a person recognized further subsequently is recognized as the same person as the previously recognized person tagged with P0138 and thus is tagged with the same tag of P0138.

As for each row of metadata shown in FIG. 4A, an image of a recognized object is firstly stored and information about the image (e.g., a hatched area on the right of "P0138 image" in the row of the person object P of CH1) is stored right after the image. The information about the image, i.e., the object, includes a tag (e.g., P0138) of the object, a timestamp indicating the time at which the video was recorded, information about the corresponding channel, and the location of the original video data (e.g., the storage location in video database 140), but is not limited thereto.

FIG. 4B shows inverse features generated based on the metadata shown in FIG. 4A. As the inverse features, information about a channel that records a corresponding object is listed in chronological order based on each object. Referring to FIG. 4B, the inverse features are broadly classified into objects, such as a person P and a car C, and a person object P is further classified into individual person objects P0138, P2413, . . . and a car object C is further classified into individual car objects C1217, C3448, . . . . In each object row, for example, an inverse feature row of the object P0138, channels CH1 and CH2 that record the object P0138 are followed by detailed information indicated as a dotted area. Herein, the detailed information includes information about the location of the corresponding channel, a timestamp indicating the time at which the corresponding object was recorded, and the location of the original video data in which the corresponding object was recorded, but is not limited thereto.

The metadata and inverse features generated by each video analyzing server of video analyzing server cluster 130 and stored in metadata database 170 may be used to search for video of a specific object in response to an external user's request for search. As described above with reference to FIG. 1, the user of user device 162 accessing from the outside of system 100 may make a request for a search for specific video data to system 100 through user device 162 by using a specific search query, and the search query may include a tag of a specific object. For example, if the user wants to see original video of a person corresponding to a tag of the object P0138 recognized through video output/control device 160, the user may transmit a search query including the tag P0138 to system 100 through user device 162. Video search server 190 of system 100 that receives the query may firstly search for the inverse features stored in metadata database 170 as shown in FIG. 4B. As a result of the search, video search server 190 may obtain information about channels that record or capture the object P0138, the time at which the object was recorded or captured by each channel and/or the storage location of the original video data. Video search server 190 may search video database 140 based on the information about the original video data of the object P0138 and retrieve the original video data to provide the same to the user through video output/control device 160 or to a separate display device connected to user device 162.

Herein, the user's search query may be provided in various forms as required by the user, and video search server 190 of system 100 may use the metadata and/or inverse features stored in metadata database 170 and data stored in video database 140 in various ways in order to provide the optimal search query for the user's requirements in response to various queries of the user.

FIG. 5 shows an example of channel metadata for channels of an input video providing device. Input video providing device 110 described above with reference to FIG. 1 may include devices, i.e., channels, that generate and/or provide input video in various forms. Examples of the channels may include a CCTV, a drone, etc. depending on a type of a channel, and may include a general camera, a thermal imaging camera, a depth camera, etc. depending on a photographing method. Also, characteristics of a channel may be classified depending on the location of the channel and the installation height and angle of the channel. Since input video is processed by applying image recognition algorithm data suitable for respective channels of various types, it is possible to obtain a higher recognition rate and faster recognition performance.

FIG. 5 shows an example of channel metadata of two case channels, i.e., case 1 and case 2, consisting of 13 categories. A channel ID is shown in a first row, and an IP address of a camera is shown in a second row. Channels may be classified by the encoding type of a channel, and can be classified by camera type, image resolution, recording device type and content category. The channels can be further classified by location and height of a camera, tilt angle, pan angle, number of decoding frames per second, use of a channel. An example of channel metadata of each case channel classified as described above is shown in FIG. 5. The channel meta-database, which is a set of channel metadata, may be stored in the form of metadata database 170, deep learning data result value database 320 shown in FIG. 3 or a separate database.

In an embodiment, after allocated analysis of a specific channel by routing server 120, each video analyzing server of system 100 described above with reference to FIG. 1 may retrieve a video analysis model or image recognition algorithm suitable for channel metadata of the channel with reference to the channel metadata of the channel and perform video data analysis and object recognition based on the video analysis model or image recognition algorithm. The video analysis model or image recognition algorithm may be generated through learning in deep learning server 310 described above with reference to FIG. 3 and stored in deep learning data result value database 320, or may be provided from the outside and stored in deep learning data result value database 320.

Figure 6:
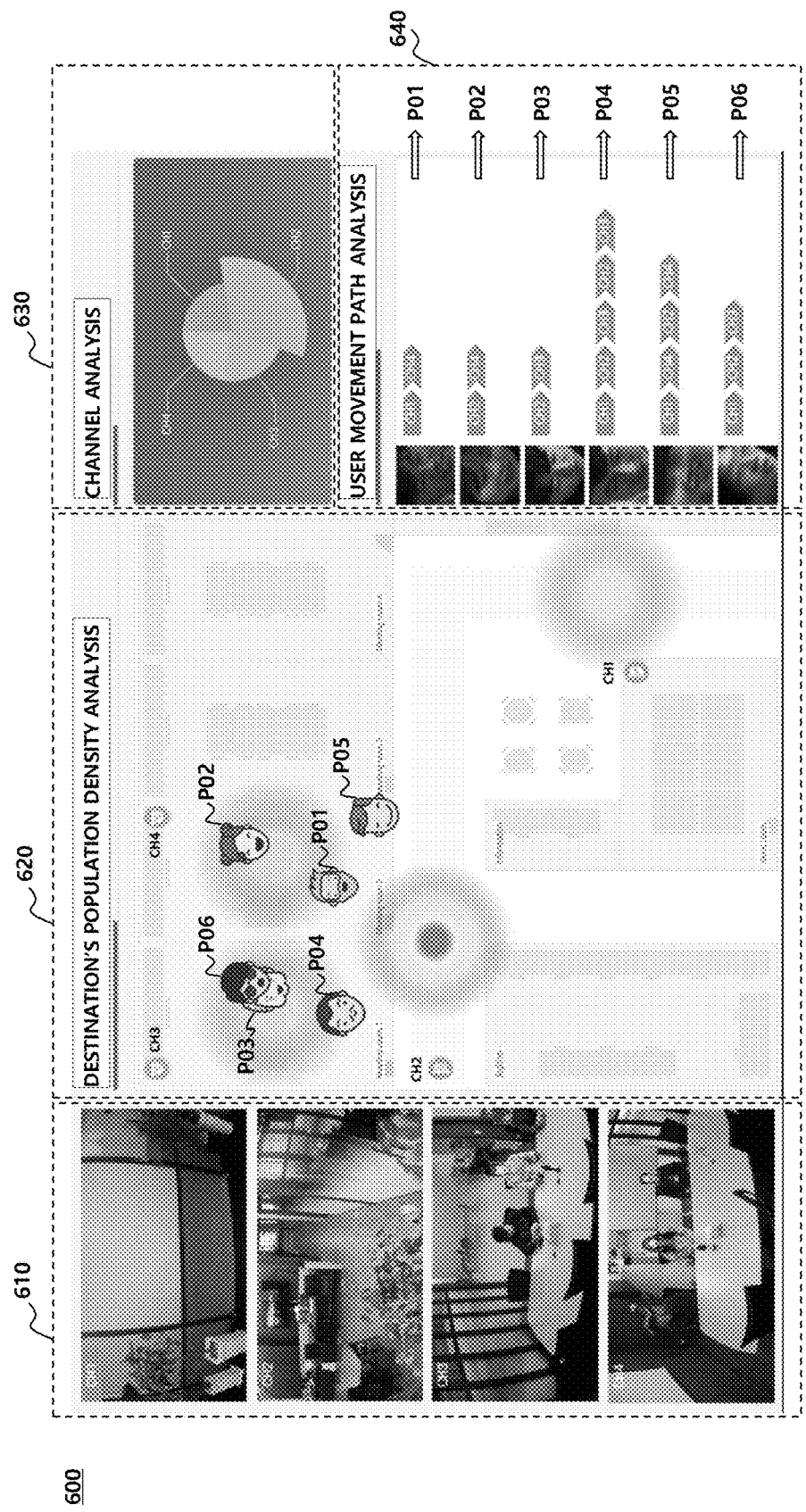
FIG. 6 shows a specific example of a picture displayed on a video output/control device as a video analysis result.

FIG. 6 shows a specific example of a picture displayed on a video output/control device as a video analysis result.

As described above with reference to the embodiment shown in FIG. 1, input video recognized and analyzed by each video analyzing server of video analyzing server cluster 130 is provided to video converter 150, and video converter 150 converts the recognized and analyzed input video into a predetermined format suitable for transmission to and display on video output/control device 160. Also, as described above with reference to the embodiment shown in FIG. 2, when video converter 150 is provided on the user side outside system 200, i.e., in video output/control device 160 of the user, video converter 150 receives video data analyzed and recognized by video analyzing server cluster 130 of system 200 through I/O server 180 and converts the analyzed and recognized video data into a format previously set by the user of video output/control device 160. FIG. 6 shows an example of a picture, i.e., a graphic user interface 600, converted into a predetermined format by video converter 150 and displayed on video output/control device 160.

Referring to FIG. 6, graphic user interface 600 displayed on video output/control device 160 includes a channel video display part 610 that displays real-time video from a plurality of channels, a space display part 620 that displays the state of the spaces covered by the respective channels, a channel analysis part 630 that displays an analysis result of each channel and an object movement path analysis part 640 that displays the movement paths of objects recognized by each channel. Each of these parts is listed and configured as an example, and some of these parts may be removed or other necessary screen parts may be added according to the requirements and needs of the user of video output/control device 160.

Channel video display part 610 displays the state where a video analyzer server analyzes video recorded by each of a plurality of channels in real time and recognizes objects. In the embodiment shown in FIG. 6, an object to be recognized is limited to a person. Channel video display part 610 displays images from four channels, i.e., CH1, CH2, CH3 and CH4. CH1 shows an image of an entrance, CH2 shows an image of a corridor, and each of CH3 and CH4 shows an image of a meeting room. In the images from CH1 and CH2, any person as an object to be recognized is not recognized, and in each of the images from CH3 and CH4, three persons are recognized.

Space display part 620 displays the installation locations of the respective channels and the present locations of objects recognized by the channels on a floor plan of the space installed with the channels. That is, CH1 is installed by the entrance on the floor plan of the space, CH2 is installed at the corridor, CH3 is installed at a meeting room 1, and CH4 is installed at a meeting room 2. Also, as shown in FIG. 6, three objects, i.e., persons, tagged with P03, P04 and P06 are located in the meeting room 1 installed with CH3, and three persons tagged with P01, P02 and P05 are located in the meeting room 2 installed with CH4.

Object movement path analysis part 640 displays movement paths of the respective objects. Graphic user interface 600 shown in FIG. 6 displays the present state of objects P01 to P06 located in the meeting room 1 and the meeting room 2 through respective movement paths. For example, object P04 of object movement path analysis part 640 is recognized sequentially by each of CH1, CH2, CH3, CH2 and CH3, which means that the person tagged with P04 enters the entrance (CH1), passes through the corridor (CH2), gets into the meeting room 1 (CH3), gets out again to the corridor (CH2) and presently enters again the meeting room 1 (CH3). Also, object P01 of object movement path analysis part 640 is recognized sequentially by CH1 and CH4, which means that the person tagged with P01 enters the entrance (CH1), passes through the corridor (CH2), gets into the meeting room 2 (CH4), but is not recognized by CH2 installed at the corridor.

Channel analysis part 630 displays a recognition result of each channel. As for the number of times of recognition of each object by each channel shown in object movement path analysis part 640, each of CH1, CH3 and CH4 performs object recognition a total of four times and CH2 performs object recognition a total of eight times. Channel analysis part 630 graphically displays the number of times of object recognition, which makes it convenient for the user to see the number of times of object recognition by each channel.

In this way, video converter 150 receives analysis and object recognition result data as well as a video signal of each channel from video analyzing server cluster 130, generates graphic user interface 600 in a format previously set by the user of video output/control device 160 and provides graphic user interface 600 to video output/control device 160. Thus, it is possible to provide the user with the present state of objects in a space and an analysis result in a more intuitive and comprehensive manner.

Figure 7:
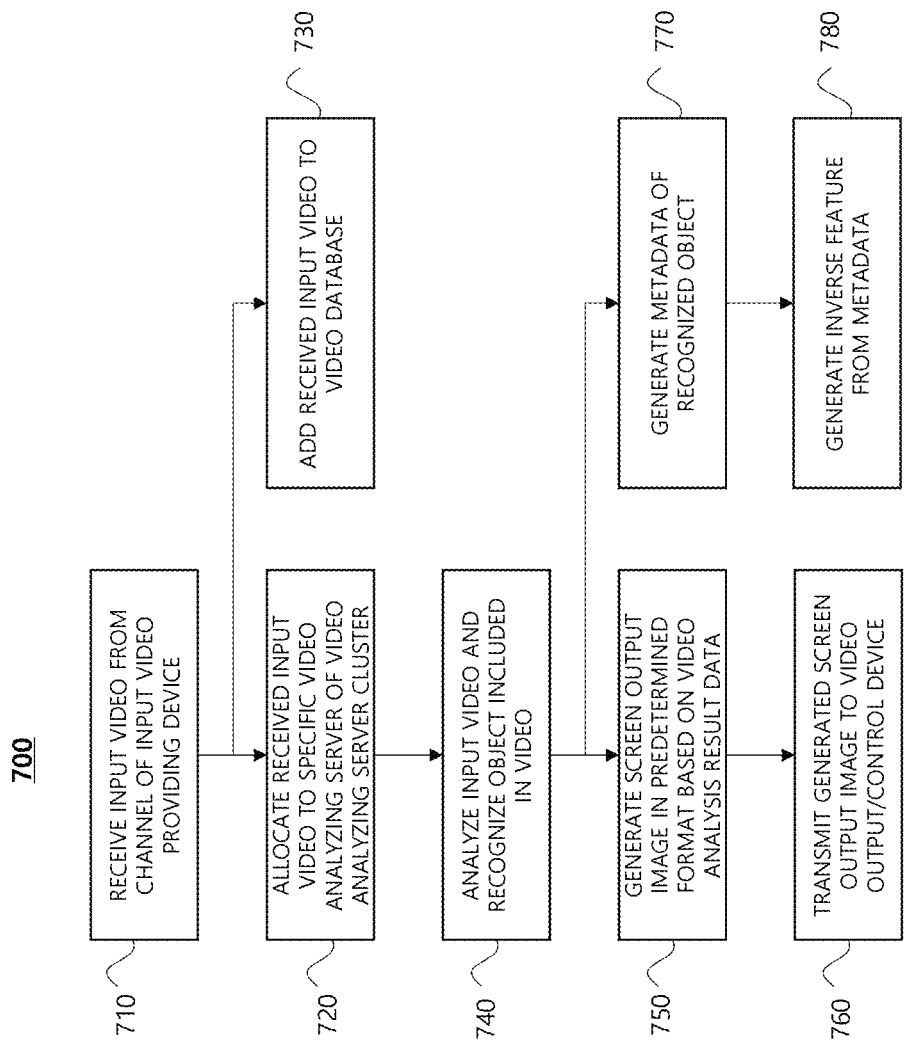
FIG. 7 shows an example of a process for integrated analysis and management of video data according to at least some embodiments of the present disclosure.

FIG. 7 shows an example of a process 700 for integrated analysis and management of video data according to at least some embodiments of the present disclosure.

Process 700 shown in FIG. 7 may include one or more operations, functions or actions as illustrated by blocks 710, 720, 730, 740, 750, 760, 770 and/or 780. The operations schematically illustrated in FIG. 7 are provided by way of example only, and some of the operations may be optional, may be combined into fewer operations, or may be expanded to additional operations without departing from the spirit of the disclosed embodiment. The blocks of process 700 shown in FIG. 7 may have identical or similar functions or actions to those described above with reference to FIG. 1 to FIG. 3, but are not limited thereto. Further, in a non-limiting embodiment, process 700 shown in FIG. 7 may be performed by system 100 shown in FIG. 1, system 200 shown in FIG. 2, or system 300 shown in FIG. 3.

Therefore, the blocks of process 700 shown in FIG. 7 will be described below in association with the components used in the systems shown in FIG. 1 to FIG. 3.

Referring to FIG. 7, process 300 may begin in block 710 to receive input video from a channel of an input video providing device.

In block 710, system 100, 200 or 300 for integrated analysis and management of video data receives input video generated by a plurality of input video generating devices included in input video providing device 110. Input video providing device 110 may include a plurality of input video generating devices. The input video generating device may be a video recording device such as a CCTV, a camera installed in a drone, or a device, such as a synthetic video generator, that generates synthetic video instead of an actual image obtained through a video recording device. Each of such various input video generating devices constitutes a single video channel, and input video generated by each channel is provided as original video data to system 100, 200 or 300. Process 700 may continue from block 720 to block 720 to allocate the received input video to a specific video analyzing server of a video analyzing server cluster and/or to block 730 to add the received input video to a video database.

In block 720, routing server 120 of system 100, 200 or 300 may allocate the input video received from input video providing device 110 to a specific video analyzing server of video analyzing server cluster 130. In this case, routing server 120 may route processing of images from a specific channel to a specific server in video analyzing server cluster 130 according to characteristics of each channel of input video providing device 110. Each video analyzing server of the video analyzing server cluster 130 may be designed to be suitable for analysis of specific video, and routing server 120 may allocate the video to a suitable video analyzing server according to channel characteristics of the input video in a state in which characteristics of each video analyzing server are identified in advance. Meanwhile, in block 730, routing server 120 of system 100, 200 or 300 may receive the input video from each channel of input video providing device 110 and the input video as original video data in video database 140. The original video data stored in video database 140 may be provided to user device 162 in response to a user's request for search. Process 700 may continue from block 720 to block 740 to analyze the input video and recognize objects included in the video.

In block 740, each video analyzing server of video analyzing server cluster 130 of system 100, 200 or 300 may analyze the input video from channel allocated by routing server 120 to perform object recognition. In this case, each video analyzing server may process the input video by applying an image recognition algorithm suitable for a channel for video data to be processed. Further, each video analyzing server may retrieve metadata of a corresponding channel from a channel meta-database regarding attributes of each channel and process the input video by applying an image recognition algorithm suitable for the channel metadata. Furthermore, each video analyzing server may perform video analysis and object recognition by using a video analysis model or image recognition algorithm generated through learning of deep learning server 310 and stored in deep learning data result value database 320 or a video analysis model or image recognition algorithm generated by an external system and stored in deep learning data result value database 320. Process 700 may continue from block 740 to block 750 to generate a screen output image in a predetermined format based on a video analysis result data and/or to block 770 to generate metadata of the recognized object.

In block 750, video converter 150 of system 100 or 300 generates a graphic user interface in a predetermined format suitable for transmission of the recognized and analyzed input video to video output/control device 160 and display of the same thereon. In this case, the generated graphic user interface may have the same configuration as graphic user interface 600 shown in FIG. 6, but is not limited thereto. Meanwhile, when video converter 150 is provided in video output/control device 160 outside the system as in system 200 shown in FIG. 2, block 750 and its subsequent block 760 may be omitted. In this case, system 200 may transmit the input video subjected to analysis and object recognition by video analyzing server cluster 130 and related data to external video converter 150 through I/O server 180 or without passing through I/O server 180. Process 700 may continue from block 750 to block 760 to transmit the generated screen output image to a video output/control device.

In block 760, I/O server 180 of system 100 or 300 may transmit the screen output image generate by video converter 150 in the same form as graphic user interface 600 shown in FIG. 6 to video output/control device 160. As described above, I/O server 180 may be omitted in system 100 or 300, and in this case, video converter 150 may transmit the generated screen image directly to video output/control device 160 without passing through any I/O server. Video output/control device 160 provided outside the system may display and provide the received screen image to the user.

In block 770, each video analyzing server of video analyzing server cluster 130 in system 100, 200 or 300 may generate metadata of each object through analysis and object recognition. As shown in FIG. 4A, the metadata may be classified in rows such as a person P, a car C, etc. depending on a type of an object recognized from video data provided by a corresponding channel for each of a plurality of channels CH1, CH2, . . . , and may be composed of an object image of objects recognized from each row as well as information about the object image, such as a tag of the object, a timestamp, information about the corresponding channel, and the location of the original video data listed in chronological order. Process 700 may continue from block 770 to block 780 to generate inverse features from the metadata.

In block 780, each video analyzing server of video analyzing server cluster 130 in system 100, 200 or 300 may generate inverse features from the metadata generated in block 770. As shown in FIG. 4B, the inverse features may be composed of information about a channel that records a corresponding object listed in chronological order based on each object.

The metadata generated in block 770 and the inverse features generated in block 780 may be stored in metadata database 170 of system 100, 200 or 300 and may be used later to search for video of a specific object in response to an external user's request for search.

Meanwhile, the operation of generating the metadata in block 770 and the subsequent operation of generating the inverse features in block 780 may be performed in parallel with block 750 where the screen output image is generated in the predetermined format based on the video analysis result data or may be performed before or after block 750.

Figure 8:
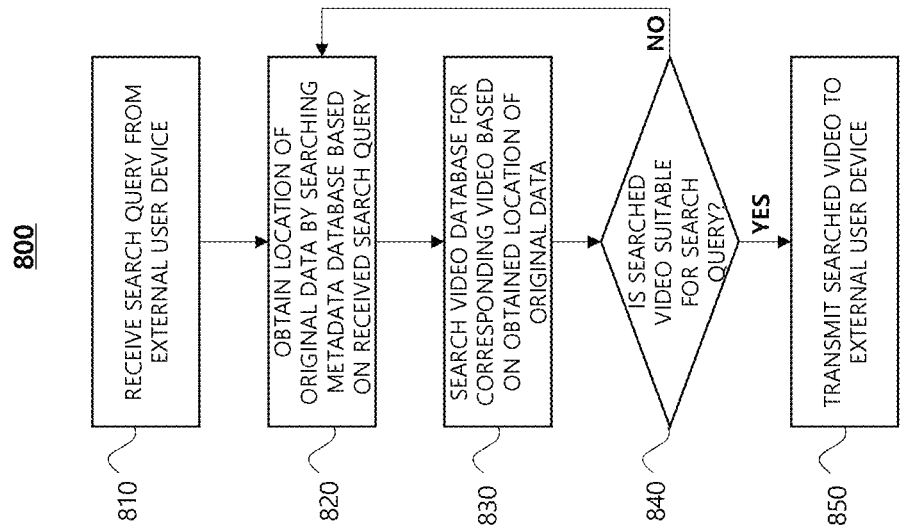
FIG. 8 shows an example of a process for search of video data according to at least some embodiments of the present disclosure.

FIG. 8 shows an example of a process for search of video data according to at least some embodiments of the present disclosure.

A process 800 shown in FIG. 8 may include one or more operations, functions or actions as illustrated by blocks 810, 820, 830, 840 and/or 850. The operations schematically illustrated in FIG. 8 are provided by way of example only, and some of the operations may be optional, may be combined into fewer operations, or may be expanded to additional operations without departing from the spirit of the disclosed embodiment. The blocks of process 800 shown in FIG. 8 may have identical or similar functions or actions to those described above with reference to FIG. 1 to FIG. 3, but are not limited thereto. Further, in a non-limiting embodiment, process 800 shown in FIG. 8 may be performed by system 100 shown in FIG. 1, system 200 shown in FIG. 2, or system 300 shown in FIG. 3. Therefore, the blocks of process 800 shown in FIG. 8 will be described below in association with the components used in the systems shown in FIG. 1 to FIG. 3.

Referring to FIG. 8, process 800 may begin in block 810 to receive a search query from an external user device.

In block 810, system 100, 200 or 300 for integrated analysis and management of video data may receive a search query requesting video data for a specific object from external user device 162. In an embodiment, the user of user device 162 may write a search query by specifying an object to be searched through a screen displayed on video output/control device 160. The search query may include a tag or label of a specific object, a channel that provides video including the object, a place and/or time period thereof. Process 800 may continue to block 820 to search a metadata database based on the search query received in block 810 and obtain the location of original data.

In block 820, video search server 190 of system 100, 200 or 300 may obtain the storage location of original video data suitable for the search query by searching for metadata stored in metadata database 170 based on the search query received from external user device 162. In this case, video search server 190 may specify a search target object with a tag, label or thumbnail of the object included in the search query, and may obtain the location of video data including the object and/or a channel that records the video data and a recording time from metadata database 170. Process 800 may continue to block 830 to search for the video from the video database the corresponding video from a video database based on the location of the original data obtained in block 820.

In block 830, video search server 190 of system 100, 200 or 300 may search video database 140 based on the location of the video data requested by the search query and/or the channel that records the video data and the recording time obtained in block 820. Video database 140 may be a NoSQL database based on Hbase. In this case, video database 140 may generate input video input from a specific channel in a row without limitation to the number of columns. When video search server 190 obtains the channel and recording time suitable for the search query from metadata database 170, it is only necessary to search a row of the channel and recording time without a need to search all the rows. Accordingly, it is possible to search for video data much faster. Process 800 may continue to block 840 to verify whether the video searched in block 830 is suitable for the search query.

In block 840, video search server 190 of system 100, 200 or 300 may verify whether the video data searched from video database 140 is suitable for the search query from external user device 162. This verification operation may be performed in various known ways, and in some embodiments, the verification operation of block 840 may be omitted. As a result of the verification, if it is determined that the searched video data is not suitable for the search query, video search server 190 may perform block 820 again to search metadata database 170, or in some embodiments, video search server 190 may perform block 830 to search video database 140 without performing the operation of searching metadata database 170. Process 800 may continue to block 850 to transmit the video searched in block 840 to the external user device.

In block 850, I/O server 180 of system 100, 200 or 300 may transmit video data searched by video search server 190 and suitable for the search query to external user device 162. In some examples of the system in which I/O server 180 is omitted, video search server 190 may directly transmit a search result to external user device 162. Further, in some embodiments, video converter 150 may generate an appropriate graphic user interface in a format previously set by the user based on the search result and transmit the graphic user interface to user device 162 and/or the video output/control device. Process 800 shown in FIG. 8 enables an external user to be easily and quickly search for and view an original video image of a specific object that he or she wants to find and to be provided with an object analysis result such as a movement path of the object.

Figure 9:
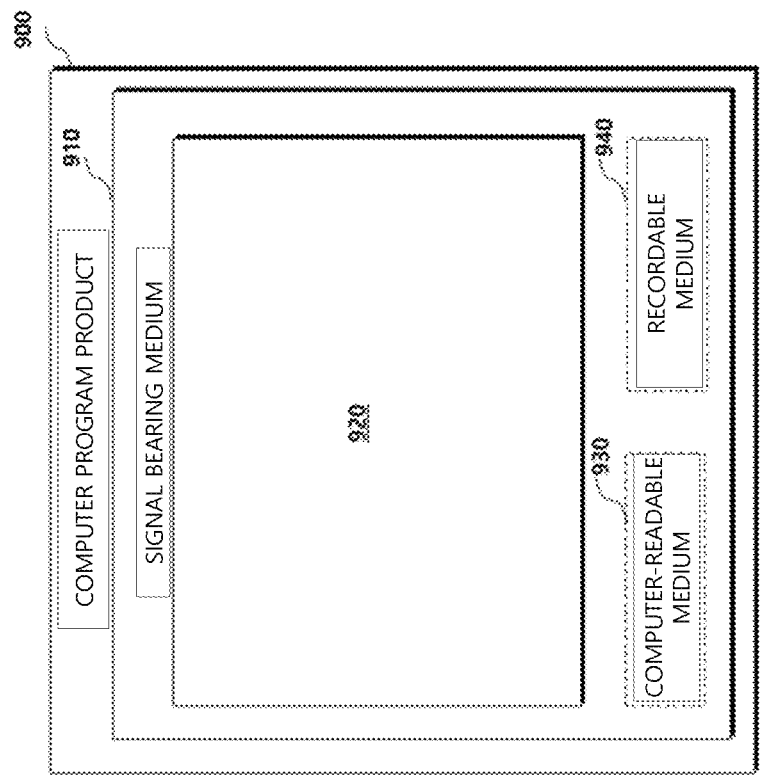
FIG. 9 shows an example of a computer program product that can be used for integrated analysis and management of video data according to at least some embodiments of the present disclosure.

FIG. 9 shows an example of a computer program product 900 that can be used for integrated analysis and management of video data according to at least some embodiments of the present disclosure. The computer program product is provided by using a signal bearing medium 910. In some embodiments, one or more signal bearing mediums 910 of computer program product 900 may include a computer-readable medium 930 and/or a recordable medium 940.

Instructions 920 included in signal bearing medium 910 may be executed by one or more computing devices included in system 100, 200 or 300 for integrated analysis and management of video data. Instructions 920 may include at least one of an instruction to receive input video from a channel of an input video providing device, an instruction to allocate the received input video to a specific video analyzing server of a video analyzing server cluster, an instruction to add the received input video to a video database, an instruction to analyze the input video and recognize objects included in the video, an instruction to generate metadata of the recognized object, an instruction to generate inverse features from the generated metadata, an instruction to generate a screen output image in a predetermined format based on a video analysis result data, and an instruction to transmit the generated screen output image to a video output/control device.

The above description of the present disclosure is provided for the purpose of illustration, and it would be understood by a person with ordinary skill in the art that various changes and modifications may be made without changing technical conception and essential features of the present disclosure. Thus, it is clear that the above-described embodiments are illustrative in all aspects and do not limit the present disclosure. For example, each component described to be of a single type can be implemented in a distributed manner. Likewise, components described to be distributed can be implemented in a combined manner.

The claimed subject matter is not limited in scope to the particular implementations described herein. For example, some implementations may be in hardware, such as employed to operate on a device or combination of devices, for example, whereas other implementations may be in software and/or firmware. Likewise, although claimed subject matter is not limited in scope in this respect, some implementations may include one or more articles, such as a signal bearing medium, a storage medium and/or storage media. This storage media, such as CD-ROMs, computer disks, flash memory, or the like, for example, may have instructions stored thereon, that, when executed by a computing device, such as a computing system, computing platform, or other system, for example, may result in execution of a processor in accordance with the claimed subject matter, such as one of the implementations previously described, for example. As one possibility, a computing device may include one or more processing units or processors, one or more input/output devices, such as a display, a keyboard and/or a mouse, and one or more memories, such as static random access memory, dynamic random access memory, flash memory, and/or a hard drive.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware. The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative example of the subject matter described herein applies regardless of the particular type of signal bearing medium used to actually carry out the distribution.

While certain example techniques have been described and shown herein using various methods and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter also may include all implementations falling within the scope of the appended claims, and equivalents thereof.

Throughout this document, the term "connected to" may be used to designate a connection or coupling of one element to another element and includes both an element being "directly connected to" another element and an element being "electronically connected to" another element via another element. Through the whole document, the term "on" that is used to designate a position of one element with respect to another element includes both a case that the one element is adjacent to the other element and a case that any other element exists between these two elements. Further, through the whole document, the term "comprises or includes" and/or "comprising or including" used in the document means that one or more other components, steps, operation and/or existence or addition of elements are not excluded in addition to the described components, steps, operation and/or elements unless context dictates otherwise. Through the whole document, the term "about or approximately" or "substantially" is intended to have meanings close to numerical values or ranges specified with an allowable error and intended to prevent accurate or absolute numerical values disclosed for understanding of the present disclosure from being illegally or unfairly used by any unconscionable third party.

The scope of the present disclosure is defined by the following claims rather than by the detailed description of the embodiment. It shall be understood that all modifications and embodiments conceived from the meaning and scope of the claims and their equivalents are included in the scope of the present disclosure.

We claim:

1. A system that comprises a processor coupled to a memory for integrated analysis and management of video data, comprising:
   a video analyzing server cluster including a plurality of video analyzing servers configured to analyze the video data;
   a routing server configured to receive video data from an external input video providing device, wherein the routing server is further configured to allocate analysis of the video data to a specific video analyzing server among the plurality of video analyzing servers of the video analyzing server cluster according to characteristics of the received video data;

a video database configured to store the received video data;
a metadata database configured to store metadata of the video data; and
a video search server configured to search the metadata database and the video database.

2. The system for integrated analysis and management of video data of claim 1, wherein the characteristics of the received video data include at least one of a type of a channel that records the video data, a characteristic of the channel, and a type of an object to be recognized among objects recorded in the video data.

3. The system for integrated analysis and management of video data of claim 1,
wherein the video database is a NoSQL database based on Hbase.

4. The system for integrated analysis and management of video data of claim 1,
wherein the specific video analyzing server allocated the analysis of the video data by the routing server among the plurality of video analyzing servers of the video analyzing server cluster is further configured to analyze the video data to recognize one or more objects included therein and generate the metadata according to a recognition result.

5. The system for integrated analysis and management of video data of claim 4,
wherein the specific video analyzing server is further configured to generate inverse features based on the generated metadata, and
the metadata database is further configured to store the generated inverse features.

6. The system for integrated analysis and management of video data of claim 1,
wherein the video search server is further configured to receive a video search query from an external user device and search at least one of the metadata database and the video database based on the received search query.

7. The system for integrated analysis and management of video data of claim 6,
wherein the video search server is further configured to obtain information about video data required in the search query by searching the metadata database based on the search query, and obtain the video data required in the search query by searching the video database based on the obtained information.

8. The system for integrated analysis and management of video data of claim 1, further comprising:
a video converter configured to generate a graphic user interface in a predetermined format based on an analysis result of the video analyzing server cluster.

9. The system for integrated analysis and management of video data of claim 1, further comprising:
an I/O server configured to transmit an analysis result image of the video analyzing server cluster to an external video output/control device and receive a video search query from an external user device.

10. The system for integrated analysis and management of video data of claim 1, further comprising:
a deep learning server configured to learn video data stored in the video database and generate a video analysis model; and
a learning data result value database configured to store the video analysis model generated in the deep learning server.

11. The system for integrated analysis and management of video data of claim 10,
wherein the deep learning server is further configured to provide at least one of easy training and hard training for video data learning to a user connected through a deep learning platform web interface for a number of users outside the system.

12. A method for integrated analysis and management of video data that is performed by one or more computing devices in a video analysis and management system, comprising:
a process of receiving video data from any one channel of an input video providing device including a plurality of channels;
a process of allocating the received video data to a specific video analyzing server of a video analyzing server cluster including a plurality of video analyzing servers in the video analysis and management system according to characteristics of the received video data;
a process of analyzing the video data by the specific video analyzing server to recognize one or more objects included therein; and
a process of generating a graphic user interface in a predetermined format based on an analysis result and an object recognition result.

13. The method for integrated analysis and management of video data of claim 12, further comprising:
a process of storing the received video data in a video database in the video analysis and management system,
wherein the video database is a NoSQL database based on Hbase.

14. The method for integrated analysis and management of video data of claim 13, further comprising:
a process of generating metadata of the recognized one or more objects by the specific video analyzing server;
a process of generating inverse features based on the generated metadata by the specific video analyzing server; and
a process of storing the generated metadata and inverse features in a metadata database in the video analysis and management system.

15. The method for integrated analysis and management of video data of claim 14, further comprising:
a process of receiving a search query for a specific object from an external user device;
a process of searching at least one of the metadata database and the video database based on the received search query; and
a process of transmitting a search result to the external user device.

16. The method for integrated analysis and management of video data of claim 15, further comprising:
a process of determining whether the search result is suitable for the search query; and
a process of searching at least one of the metadata database and the video database based on the received search query when it is determined not suitable for the search query.

17. The method for integrated analysis and management of video data of claim 12, wherein the process of analyzing the video data by the specific video analyzing server to recognize one or more objects included therein includes:
a process of analyzing the video data to recognize one or more objects included therein based on at least one of a video analysis model generated through deep learning based on channel metadata of a channel that provides the video data and a separate video analysis model received from outside of the video analysis and management system.

18. A non-transitory computer-readable storage medium that stores a computer program for integrated analysis and management of video data, wherein the computer program includes one or more instructions to be executed by one or more computing devices in a video analysis and management system, and the one or more instructions include:
at least one instruction to receive video data from any one channel of an input video providing device including a plurality of channels;
at least one instruction to allocate the received video data to a specific video analyzing server of a video analyzing server cluster including a plurality of video analyzing servers in the video analysis and management system according to characteristics of the received video data;
at least one instruction to analyze the video data by the specific video analyzing server to recognize one or more objects included therein; and
at least one instruction to generate a graphic user interface in a predetermined format based on an analysis result and an object recognition result.

19. The non-transitory computer-readable storage medium of claim 18, wherein the one or more instructions include:
at least one instruction to receive a search query for a specific object from an external user device;
at least one instruction to search at least one of a metadata database and a video database based on the received search query; and
at least one instruction to transmit a search result to the external user device.

\* \* \* \* \*